Patented May 2, 1939

2,156,275

UNITED STATES PATENT OFFICE 2,156,275

PREGNANOLONES AND METHODS FOR PRODUCING THE SAME FROM 3-HYDROXY BISNORCHOLANIC ACIDS

Adolf Butenandt, Danzig-Langfuhr, Free City of Danzig, and Friedrich Hildebrandt, Hohen Neuendorf, near Berlin, Germany, assignors to Schering Aktiengesellschaft, a corporation of Germany No Drawing. Application December 24, 1934, Serial No. 759,116. In Germany December 23, 1933

25 Claims. (Cl. 260—397)

(Granted under the provisions of sec. 14, act of March 2, 1927; 357 O. G. 5)

This invention relates to organic compounds and more particularly to pregnanolones and their derivatives and methods for producing the same from 3-hydroxy bisnorcholanic acids.

3-hydroxy bisnorcholenic acids are obtained on splitting up sterines having in the side-chain in $\beta, \gamma$-position a double bond, and are readily transformed by hydrogenation into the corresponding 3-hydroxy bisnorcholanic acids.

We have found that the side chain of said 3-hydroxy bisnorcholanic acids can be further shortened by first converting said acids into their carboxylic esters then reacting said esters with an organo-metal compound, especially with Grignard's reagent, as described, for instance, by Butenandt and his co-workers for splitting up the bisnorcholanic acids (Berichte d. deutschen chem. Ges. 64, 2533, 1931), so as to form the corresponding tertiary carbinols, then splitting off water at the tertiary hydroxy group and the neighboring tertiary hydrogen atom of the side-chain and finally oxidizing, for instance, by means of ozone, the double bond formed thereby in the molecule. In the course of this reaction the hydroxy ketones pregnanolon or allo-pregnanolon of the formula $C_{21}H_{34}O_2$ are obtained. Both hydroxyketones are exceptionally valuable as intermediate products for the manufacture of physiologically effective compounds.

The reaction may be illustrated by the following structural formulas.

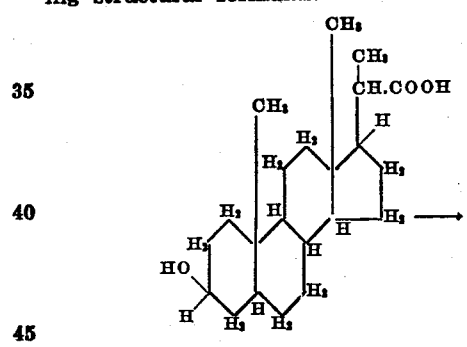

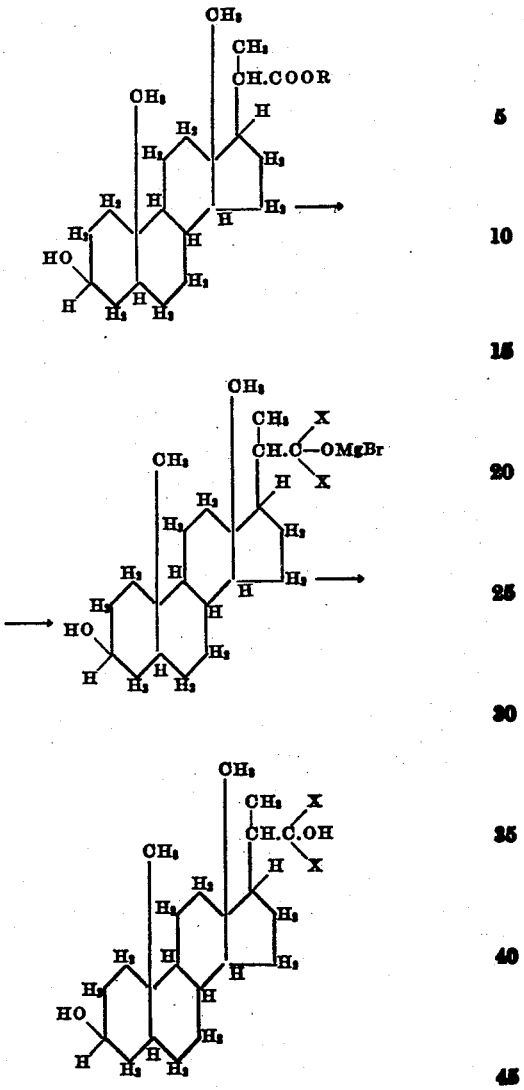

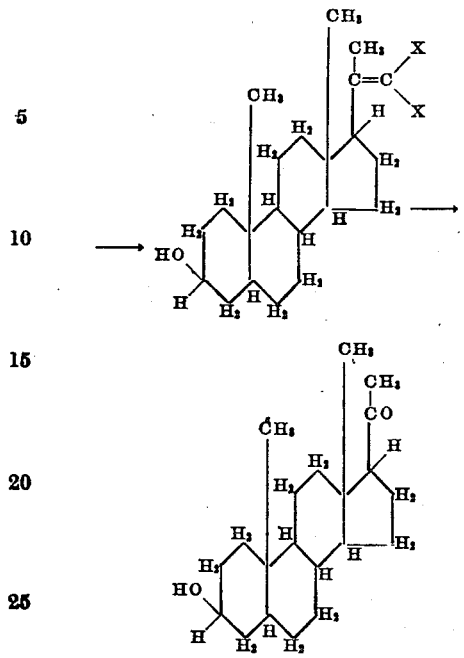

In the above formulas X represents any hydrocarbon radical which may form part of a Grignard compound, such as methy, ethyl, benzyl, etc.

In an analogous manner it is possible to decompose the esters of such bisnorcholanic acids in which the hydroxy group at the C-atom 3 has been protected by being substituted by halogen or by etherifying or esterifying. From the reaction products thus formed, the hydroxy ketones pregnanolon and allo-pregnanolon can be obtained by suitable treatment, Under appropriate conditions of reaction the derivatives of the pregnanolones, such as their ethers, esters and 3-halogen-substitution products, may be isolated as such.

The following examples serve to illustrate the invention, without, however, limiting the same to them:

Example 1

1 g. of the methyl ester of the 3-hydroxy bisnorallocholanic acid, acetylated at the hydroxy group, is reacted in ethereal solution with an excess of phenyl magnesium bromide. The reaction product is distilled with steam in order to remove the by-products produced during the reaction, such as diphenyl, and diphenyl methyl carbinol, and the non-volatile residue is boiled in a 5% methyl-alcoholic potassium hydroxide solution to saponify any unreacted ester. After the separation of the acid constituents, an aromatic carbinol is obtained.

The carbinol is then heated to the boiling point for several hours in a solution of glacial acetic acid and, after the removal of the solvent, slowly distilled in a high vacuum. By this operation one molecule of water is split off between the teritary hydroxy group and the neighbouring tertiary hydrogen atom of the side-chain.

The unsaturated secondary ester thus obtained and having a single carbon-carbon double bond is now treated in chloroform solution with ozone while cooling with a freezing mixture. The chloroform solution is then decomposed by water and heated for some time to the boiling point. After drying and evaporating the solvent there remains, besides benzophenone, a residue which on hydrolysis yields the hydroxyketone of the formula $C_{21}H_{34}O_2$.

Example 2

1.3 g. of hydroxy bisnorcholenic acid are suspended in 300 ccm. of glacial acetic acid and hydrogenated by hydrogen in the presence of a patinum catalyst.

After the completion of the hydrogen absorption there remains a clear solution. The hydrogenated product, the 3-hydroxy bisnorallocholanic acid is recrystallised from glacial acetic acid. Its melting point is 167° C. The pure acid melts at 170° C. The yield amounts to 1.085 g.

1.085 g. of the hydrogenated acid are esterified with an ethereal solution of diazomethane in the presence of a little methanol. The methyl ester crystallizes from methanol in prism-shaped crystals of the melting point 152.5° C. The yield is 1.060 g.

To 1.625 g. of magnesium and 10.5 g. of bromo benzene in 70 ccm. of ether there are added 1.040 g. of 3-hydroxy bisnorallocholanic acid ester in 190 ccm. of ether. After the addition of 50 ccm. of benzene the reaction mixture is heated for two hours on the water bath whereupon the ether is distilled off and the remaining benzene solution is heated to boiling for another hour. After the evaporation of the benzene the residue is heated for a further six hours on the boiling water bath. The reaction mixture is then decomposed by means of ice water, acidified with diluted sulphuric acid and extracted with ether.

After the evaporation of the ether the residue is distilled with steam in order to remove any diphenyl that has formed, and the non-volatile portion is heated for 9 hours with 8% methylalcoholic potassium hydroxide solution. The neutral portions remaining after saponification are treated again with steam and, after drying, heated to the boiling point in glacial acetic acid solution for 3 and a half hours. After concentrating the acetic acid solution, a product crystallizes which shows, after repeated recrystallization from glacial acetic acid, a melting point of 238.5° C., and does not change when boiled with glacial acetic acid anhydride and on distillation in a high vacuum.

350 mg. of the acetate $C_{36}H_{46}O_2$ are dissolved in 20 ccm. of chloroform and treated in two portions each for 10 minutes with ozone (7 mg. ozone per minute) while cooling with ice. The united oxidation solutions are heated with 7 ccm. of water for half an hour to the boiling point. After the removal of the solvent the dry residue is distilled in high vacuum (0.001 mm. Hg). The crystalline portions distilling between 90° and 120° (160 mg.) are recrystallized after the boiling with animal charcoal from methanol. The melting point of said compound is 144.5° C. (uncorrected). The saponification of the acetate is carried out by heating 72 mg. of the same for 1 hour in 13 ccm. of 10% methylalcoholic potassium hydroxide solution. The allo-pregnanolon-20 which is precipitated after acidifying the solution by the addition of water is recrystallized from diluted alcohol. Yield: 50 mgs. of a product having a melting point of 194.5° C. are obtained. The oxime of this compound melts after recrystallisation from alcohol at 224–225° C.

Example 3

The methyl ester of the 3-hydroxy bisnorcholanic acid is treated in exactly the same manner as the methyl ester of the 3-hydroxy bisnorallocholanic acid in Example 2. As reaction product pregnanolon is obtained.

Of course, instead of phenyl magnesium bromide, other Grignard reagents, such as methyl magnesium bromide and the like, may be used.

Instead of using the methyl carboxylic esters of the 3-hydroxy bisnorcholanic acids, other esters may be employed as starting materials. The hydroxy group at the C-atom 3 in ring 1 may be protected not only by acetylation as described in Example 1, but may be combined with any other suitable acyl group, such as the benzoyl group and the like. One may even substitute the OH-group in ring 1 by halogen and, after converting the bisnorcholanic acid to the corresponding pregnanolone, replacing the halogen by reaction with alkali acetates or silver acetate and the like or by simple hydrolysis.

As dehydrating agents to split off water between the tertiary hydroxy group and the tertiary hydrogen atom in the side-chain, there may be used, besides glacial acetic acid, other customary agents. In many cases it is even sufficient to heat the compound obtained on reaction with Grignard reagent, to a higher temperature, preferably in the presence of an excess of said Grignard reagent.

The oxidation of the unsaturated compounds is preferably carried out by means of ozone; but other suitable oxidation agents may be used as well.

The expression "a compound of the Grignard type" as employed in the appended claims is to be understood as embracing not only the organomagnesium compounds, but also other organometallic compounds which are capable of entering into reactions similar to the Grignard reaction.

Of course, the given examples serve merely to illustrate the invention; various other modifications and changes in the processes and reagents may be made by those skilled in the art in accordance with the principles set forth herein and in the claims annexed hereto.

What we claim is:

1. A method for the production of a pregnanol-(3)-one-(20) of the general formula $C_{21}H_{34}O_2$, comprising reacting a carboxylic ester of a 3-hydroxy bisnorcholanic acid with a Grignard reagent, transforming said reaction product into the corresponding tertiary carbinol, subjecting said tertiary carbinol to a dehydrating treatment thereby splitting off one molecule of water between the tertiary hydroxy group and the neighbouring tertiary hydrogen atom, and oxidizing the unsaturated compound obtained thereby so as to produce the corresponding 3-hydroxy ketone of the general formula $C_{21}H_{34}O_2$.

2. A method for the production of a pregnanol-(3)-one-(20) of the general formula $C_{21}H_{34}O_2$, comprising reacting a carboxylic ester of a 3-hydroxy bisnorcholanic acid wherein the hydroxy group is protected by displacement by an acylated hydroxy group, with a Grignard reagent, transforming said reaction product into the corresponding tertiary carbinol, subjecting said tertiary carbinol to a dehydrating treatment thereby splitting off one molecule of water between the tertiary hydroxy group and the neighboring tertiary hydrogen atom oxidizing the unsaturated compound obtained thereby so as to produce the corresponding 3-hydroxy ketone of the general formula $C_{21}H_{34}O_2$, and saponifying the product to restore the 3-hydroxy group.

3. A method for the production of a pregnanol-(3)-one-(20) of the general formula $C_{21}H_{34}O_2$, comprising reacting a carboxylic ester of a 3-hydroxy bisnorcholanic acid wherein the hydroxy group is protected by displacement by a halogen, with a Grignard reagent, transforming said reaction product into the corresponding tertiary carbinol, subjecting said tertiary carbinol to a dehydrating treatment thereby splitting off one molecule of water between the tertiary hydroxy group and the neighboring tertiary hydrogen atom, oxidizing the unsaturated compound obtained thereby so as to produce the corresponding 3-hydroxy ketone of the general formula $C_{21}H_{34}O_2$, and saponifying the product to restore the 3-hydroxy group.

4. A method for the production of a pregnanol-(3)-one-(20) of the general formula $C_{21}H_{34}O_2$, comprising reacting a carboxylic ester of a 3-hydroxy bisnorcholanic acid with a Grignard reagent, transforming said reaction product into the corresponding tertiary carbinol, subjecting said tertiary carbinol to a dehydrating treatment thereby splitting off one molecule of water between the tertiary hydroxy group and the neighbouring tertiary hydrogen atom, and oxidizing the unsaturated compound obtained thereby by treatment with ozone so as to produce the corresponding 3-hydroxy ketone of the general formula $C_{21}H_{34}O_2$.

5. A method for the production of a pregnanol-(3)-one-(20) of the general formula $C_{21}H_{34}O_2$, comprising hydrogenating a 3-hydroxy bisnorcholenic acid, forming the carboxylic ester of the hydrogenation product, reacting said ester of a 3-hydroxy bisnorcholanic acid with a Grignard reagent, transforming said reaction product into the corresponding tertiary carbinol, subjecting said tertiary carbinol to a dehydrating treatment thereby splitting off one molecule of water between the tertiary hydroxy group and the neighbouring tertiary hydrogen atom, and oxidizing the unsaturated compound obtained thereby so as to produce the corresponding 3-hydroxy ketone of the general formula $C_{21}H_{34}O_2$.

6. An acyl compound of a pregnanolon of the general formula $C_{21}H_{33}OZ$, wherein Z represents an O-acyl group, and corresponding to the following structural formula

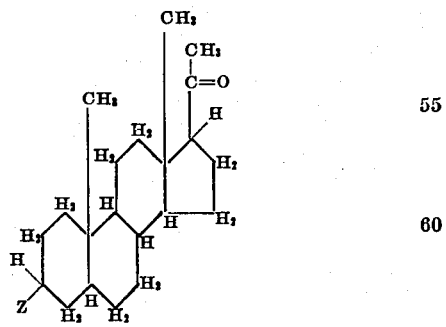

7. A method for the production of a pregnanol-(3)-one-(20) compound of the general formula $C_{21}H_{33}OX$ wherein X represents a substituent at the 3-carbon atom, said substituent being a member of the group consisting of the hydroxy group and a group which upon hydrolysis is reconverted into the hydroxy group, said method comprising treating with hydrogen a bisnorcholenic acid compound of the general formula $C_{21}H_{32}(X)Y$, wherein X represents a substituent as above defined, while Y is a member of the class consisting of the carboxyl group and esterified carboxyl groups capable of being replaced by the carboxyl group with the aid of hydrolysis, and represents a group which on reacting with an organo-metallic compound of the Grignard type is converted into a tertiary alcohol group, reacting the saturated bisnorcholanic acid so obtained with an organo-metallic compound, hydrolyzing the resulting metallic complex, subjecting the tertiary alcohol produced to a dehydrating treatment thereby splitting off one molecule of water between the tertiary hydroxy group and the neighboring tertiary hydrogen atom, and treating the unsaturated compound so obtained with an oxidizing agent so as to produce said pregnanol-(3)-one-(20) compound.

8. A method for the production of a pregnanol-(3)-one-(20) compound of the general formula $C_{21}H_{33}OX$ wherein X represents a substituent at the 3-carbon atom, said substituent being a member of the group consisting of the hydroxy group and a group which upon hydrolysis is reconverted into the hydroxy group, said method comprising treating with hydrogen a bisnorcholenic acid compound of the general formula $C_{21}H_{32}(X)Y$, wherein X represents a substituent as above defined, while Y is a member of the class consisting of the carboxyl group and esterified carboxyl groups capable of being replaced by the carboxyl group with the aid of hydrolysis, and represents a group which on reacting with a Grignard reagent is converted into a tertiary alcohol group, reacting the saturated bisnorcholanic acid so obtained with a Grignard reagent, hydrolyzing the resulting metallic complex, subjecting the tertiary alcohol produced to a dehydrating treatment thereby splitting off one molecule of water between the tertiary hydroxy group and the neighboring tertiary hydrogen atom, and treating the unsaturated compound so obtained with an oxidizing agent so as to produce said pregnanol-(3)-one-(20) compound.

9. A method for the production of a pregnanol-(3)-one-(20) compound of the general formula $C_{21}H_{33}OX$ wherein X represents a substituent at the 3-carbon atom, said substituent being a member of the group consisting of the hydroxy group and a group which upon hydrolysis is reconverted into the hydroxy group, comprising reacting with an organo-metallic compound of the Grignard type, a bisnorcholanic acid compound of the general formula $C_{21}H_{34}(X)Y$ wherein X represents a substituent as above defined, while Y is a member of the class consisting of the carboxyl group and esterified carboxyl groups capable of being replaced by the carboxyl group with the aid of hydrolysis, and represents a group which on reacting with an organo-metallic compound is converted into a teritiary alcohol group, hydrolyzing the resulting metallic complex, subjecting the tertiary alcohol so produced to a dehydrating treatment thereby splitting off one molecule of water between the tertiary hydroxy group and the neighboring tertiary hydrogen atom, and treating the unsaturated compound so obtained with an oxidizing agent to produce said pregnanol-(3)-one-(20) compound.

10. A method for the production of a pregnanol-(3)-one-(20) compound of the general formula $C_{21}H_{33}OX$ wherein X represents a substituent at the 3-carbon atom, said substituent being a member of the group consisting of the hydroxy group and a group which upon hydrolysis is reconverted into the hydroxy group, comprising reacting with a Grignard reagent a bisnorcholanic acid compound of the general formula $C_{21}H_{34}(X)Y$ wherein X represents a substituent as above defined, while Y is a member of the class consisting of the carboxyl group and esterified carboxyl groups capable of being replaced by the carboxyl group with the aid of hydrolysis, and represents a group which on reacting with a Grignard reagent is converted into a tertiary alcohol group, hydrolyzing the resulting metallic complex, subjecting the tertiary alcohol so produced to a dehydrating treatment thereby splitting off one molecule of water between the tertiary hydroxy group and the neighboring tertiary hydrogen atom, and treating the unsaturated compound so obtained with an oxidizing agent to produce said pregnanol-(3)-one-(20) compound.

11. A method for the production of a pregnanol-(3)-one-(20) compound of the general formula $C_{21}H_{33}OX$ wherein X represents a substituent at the 3-carbon atom, said substituent comprising a member of the group consisting of the hydroxy group and a group which upon hydrolysis is converted into the hydroxy group, said method comprising reacting a bisnorcholanic acid compound of the general formula $C_{21}H_{34}XY$ wherein X represents a substituting -O-acyl group at the 3-carbon atom while Y is a member of the class consisting of the carboxyl group and esterified carboxyl groups capable of being replaced by the carboxyl group with the aid of hydrolysis, and represents a group which on reacting with a Grignard reagent is converted into a tertiary alcohol group, with a Grignard reagent, subjecting the tertiary alcohol produced to a dehydrating treatment thereby splitting off one molecule of water between the tertiary hydroxy group and the neighboring tertiary hydrogen atom, and treating the unsaturated compound so obtained with an oxidizing agent so as to produce said pregnanol-(3)-one-(20) compound.

12. A method for the production of a pregnanol-(3)-one-(20) compound of the general formula $C_{21}H_{33}OX$ wherein X represents a substituent at the 3-carbon atom, said substituent comprising a member of the group consisting of the hydroxy group and a group which upon hydrolysis is converted into the hydroxy group, said method comprising reacting a bisnorcholanic compound of the general formula $C_{21}H_{34}(X)Y$ wherein X represents a substituting halogen group at the 3-carbon atom while Y is a member of the class consisting of the carboxyl group and esterified carboxyl groups capable of being replaced by the carboxyl group with the aid of hydrolysis, and represents a group which on reacting with a Grignard reagent is converted into a tertiary alcohol group, with a Grignard reagent, hydrolyzing the resulting metallic complex, subjecting the tertiary alcohol produced to a dehydrating treatment thereby splitting off one molecule of water between the tertiary hydroxy group and the neighboring tertiary hydrogen atom, and treating the unsaturated compound so obtained with an oxidizing agent so as to produce said pregnanol-(3)-one-(20) compound.

13. A method for the production of a pregnanol-(3)-one-(20) compound of the general formula $C_{21}H_{34}O_2$ comprising reacting a bisnorcholanic acid compound of the general formula $C_{21}H_{34}(X)Y$ wherein X represents a substituting -O-acyl group at the 3-carbon atom while Y is a member of the class consisting of the carboxyl group and esterified carboxyl groups capable of being replaced by the carboxyl group with the aid of hydrolysis, and represents a group which on reacting with a Grignard reagent is converted into a tertiary alcohol group, with a Grignard reagent, hydrolyzing the resulting metallic complex, subjecting the tertiary alcohol produced to a dehydrating treatment thereby splitting off one molecule of water between the tertiary hydroxy group and the neighboring tertiary hydrogen atom, treating the unsaturated compound so obtained with an oxidizing agent, and saponifying the resulting pregnanolone derivative to produce the corresponding 3-hydroxy ketone of the general formula $C_{21}H_{34}O_2$.

14. A method for the production of a pregnanol-(3)-one-(20) compound of the general formula $C_{21}H_{34}O_2$ comprising reacting a bisnorcholanic acid compound of the general formula $C_{21}H_{34}(X)Y$ wherein X represents a substituting halogen group at the 3- carbon atom while Y is a member of the class consisting of the carboxyl group and esterified carboxyl groups capable of being replaced by the carboxyl group with the aid of hydrolysis, and represents a group which on reacting with a Grignard reagent is converted into a tertiary alcohol group, with a Grignard reagent, hydrolyzing the resulting metallic complex, subjecting the tertiary school produced to a dehydrating treatment thereby splitting off one molecule of water between the tertiary hydroxy group and the neighboring tertiary hydrogen atom, treating the unsaturated compound so obtained with an oxidizing agent so as to produce the (20) carbonyl compound, and hydrolyzing the latter to produce the corresponding 3- hydroxy ketone of the general formula $C_{21}H_{34}O_2$.

15. A method for the production of a pregnanol-(3)-one-(20) compound of the general formula $C_{21}H_{33}OX$ wherein X represents a substituent at the 3-carbon atom, said substituent being a member of the group consisting of the hydroxy group and a group which upon hydrolysis is reconverted into the hydroxy group, said method comprising reacting with a Grignard reagent a bisnorcholanic acid ester compound of the general formula $C_{21}H_{34}(X)COOR$ wherein X represents a substituent as above defined, while R is a hydrocarbon radical, hydrolyzing the resulting metallic complex, subjecting the tertiary alcohol so produced to a dehydrating treatment thereby splitting off one molecule of water between the tertiary hydroxy group and the neighboring tertiary hydrogen atom, and treating the unsaturated compound so obtained with an oxidizing agent to produce said pregnanol-(3)-one-(20) compound.

16. The method as set forth in claim 10 wherein the oxidizing agent is ozone.

17. The method according to claim 15 wherein the oxidizing agent is ozone.

18. The method according to claim 10 wherein the dehydration is accomplished by heating with glacial acetic acid to the boiling point.

19. The method according to claim 10 wherein the dehydration is accomplished by heating with an excess of Grignard reagent.

20. The method according to claim 7, wherein the bisnorcholanic acid compound is obtained by hydrogenating the bisnorcholenic acid compound to the bisnorcholanic or allo-bisnorcholanic acid compound.

21. A method according to claim 1 wherein the 3-hydroxy group of the bisnorcholanic acid is protected by conversion into a radical which can in turn be converted by hydrolysis into a hydroxy group.

22. A pregnanol-(3)-one-(20) of the structural formula

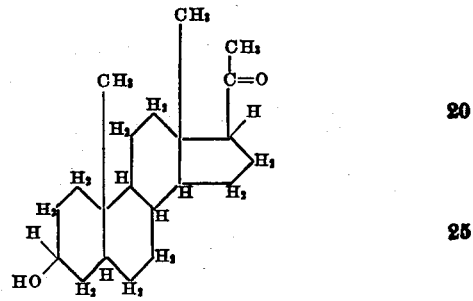

having a melting point of about 194° C., its oxime melting at about 224-225° C. when recrystallized from alcohol.

23. A pregnanolon compound of the general formula $C_{21}H_{33}OX$ wherein X is a substituent attached to the 3-carbon atom and is a member of the group consisting of the hydroxyl group and groups which can be converted by hydrolysis or saponification into the hydroxyl group.

24. A method for the production of a pregnanol-(3)-one-(20) of the general formula $C_{21}H_{34}O_2$, comprising reacting with an organo-metallic compound a bisnorcholanic acid compound of the general formula $C_{21}H_{33}(X)Y$ wherein X is a group in the 3-position which is replaceable by a hydroxyl group on hydrolysis, while Y is a carboxyl group in the form of the acid or an ester which on reacting with the organo-metallic compound is converted into a tertiary alcohol group, hydrolyzing the resulting metallic complex, subjecting the tertiary alcohol so produced to a dehydrating treatment thereby splitting off one molecule of water between the tertiary hydroxy group and the neighboring tertiary hydrogen atom, treating the unsaturated compound so obtained with an oxidizing agent, and saponifying the resulting pregnanolone derivative to produce the corresponding 3-hydroxy ketone of the general formula $C_{21}H_{34}O_2$.

25. A pregnanol-(3)-one-(20) of the general formula $C_{21}H_{34}O_2$.

ADOLF BUTENANDT.
FRIEDRICH HILDEBRANDT.